US012776866B2

(12) United States Patent
Jiang

(10) Patent No.: US 12,776,866 B2
(45) Date of Patent: Oct. 27, 2026

(54) DISCONTINUOUS RECEPTION PROCESSING METHOD AND APPARATUS, TERMINAL DEVICE, AND STORAGE MEDIUM

(71) Applicant: Beijing Xiaomi Mobile Software Co., Ltd., Beijing (CN)

(72) Inventor: Xiaowei Jiang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 311 days.

(21) Appl. No.: 18/549,238

(22) PCT Filed: Mar. 12, 2021

(86) PCT No.: PCT/CN2021/080571
§ 371 (c)(1),
(2) Date: Sep. 6, 2023

(87) PCT Pub. No.: WO2022/188171
PCT Pub. Date: Sep. 15, 2022

(65) Prior Publication Data

US 2024/0195539 A1 Jun. 13, 2024

(51) Int. Cl.
*H04L 1/1867* (2023.01)
*H04W 76/28* (2018.01)

(52) U.S. Cl.
CPC ........... *H04L 1/1883* (2013.01); *H04W 76/28* (2018.02)

(58) Field of Classification Search
None
See application file for complete search history.

(56) References Cited

U.S. PATENT DOCUMENTS

2020/0314948 A1 10/2020 Babaei et al.
2021/0029641 A1 1/2021 Khoshnevisan et al.
2022/0094484 A1* 3/2022 Babaei .............. H04W 72/1263
2023/0063082 A1* 3/2023 Zhou ...................... H04L 1/1851
2023/0189390 A1* 6/2023 Park ...................... H04W 76/28 370/252
2023/0318755 A1* 10/2023 Zeng ..................... H04L 5/0055 370/329

(Continued)

FOREIGN PATENT DOCUMENTS

JP 2017516362 A 6/2017
WO WO 2021026918 A1 2/2021

(Continued)

OTHER PUBLICATIONS

Extended European Search Report issued in Application No. 21929644.9 dated Mar. 19, 2024, 11 pages.

(Continued)

*Primary Examiner* — Saumit Shah
(74) *Attorney, Agent, or Firm* — Finnegan, Henderson, Farabow, Garrett & Dunner, L.L.P.

(57) ABSTRACT

A method for processing a discontinuous reception (DRX) is performed by a terminal device, and includes: determining that a transmission time of a downlink hybrid automatic repeat request (HARQ) process feedback of the terminal device is postponed; and processing a downlink HARQ timer of the HARQ process feedback based on a resource after the transmission time is postponed.

9 Claims, 4 Drawing Sheets

(56) References Cited

U.S. PATENT DOCUMENTS

2023/0397245 A1* 12/2023 Zhang ............... H04W 52/0225

FOREIGN PATENT DOCUMENTS

| | | |
|---|---|---|
| WO | WO 2021041017 A | 3/2021 |
| WO | WO 2022127849 A1 | 6/2022 |

OTHER PUBLICATIONS

Office Action for Russian Application No. 2023125536/07, dated Mar. 25, 2024.
ZTE, Sanechips, "Remaining issues on DRX," 3GPP TSG-RAN WG2 Meeting #100, R2-1712442, Reno, USA, Nov. 27-Dec. 1, 2017, 3 pages.
Notice of the first review opinion for Chinese Application No. 202180000748.X, dated Sep. 11, 2023.
Notice of Reasons for Refusal for Japanese Patent Application No. 2023-555650, dated Aug. 6, 2024, 17 pages.
3GPP TS 38.321 V16.3.0 (Dec. 2020), 3rd Generation Partnership Project; Technical Specification Group Radio Access Network; NR; Medium Access Control (MAC) protocol specification (Release 16), 7 pages.

* cited by examiner

DISCONTINUOUS RECEPTION PROCESSING METHOD AND APPARATUS, TERMINAL DEVICE, AND STORAGE MEDIUM

CROSS-REFERENCE TO RELATED APPLICATION

This application is the U.S. national application of International Application No. PCT/CN2021/080571, filed on Mar. 12, 2021, the entire contents of which are incorporated herein by reference.

TECHNICAL FIELD

The present disclosure relates to a field of mobile communication technologies, and specifically to a method and an apparatus for processing a discontinuous reception (DRX), a terminal device and a storage medium.

BACKGROUND

In the related art, when a transmission time of a hybrid automatic repeat request (HARQ) process feedback of a downlink semi-persistent scheduling (SPS) resource of a user equipment (UE) is postponed from a first resource to a second resource, considering from the perspective of the UE, there are two available transmission resources at a transmission time position of the HARQ process feedback, and a time position at which the UE starts a downlink round trip time (RTT) timer may be a transmission end time position of the first resource or the second resource. However, the network device and the UE cannot remain consistent with understanding of when to start a downlink HARQ RTT timer, causing that an actual discontinuous reception (DRX) activation time of the UE is inconsistent with a DRX activation time of the UE understood by the network device, so that data retransmission scheduling information of a downlink control channel of the UE fails to be received.

SUMMARY

According to a first aspect of the present disclosure, a method for processing a discontinuous reception (DRX) is performed by a terminal device. The method includes:

- determining that a transmission time of a downlink hybrid automatic repeat request (HARQ) process feedback of the terminal device is postponed; and
- processing a downlink HARQ timer of the HARQ process feedback based on a resource after the transmission time is postponed.

According to a second aspect of the present disclosure, a terminal device includes a processor and a memory storing a computer program executable by the processor. The processor is configured to determine that a transmission time of a downlink hybrid automatic repeat request (HARQ) process feedback of the terminal device is postponed; and process a downlink HARQ timer of the HARQ process feedback based on a resource after the transmission time is postponed.

According to a third aspect of the present disclosure, a non-transitory computer-readable storage medium has instructions stored. When the instructions are executed by a processor of a terminal device, the terminal device is caused to perform the method for processing the DRX as described in the first aspect. The method includes: determining a transmission time of a downlink hybrid automatic repeat request (HARQ) process feedback of the terminal device is postponed; and processing a downlink HARQ timer of the HARQ process feedback based on a resource after the transmission time is postponed.

BRIEF DESCRIPTION OF THE DRAWINGS

Example embodiments of the present disclosure will be described in detail below in conjunction with the accompanying drawings.

DETAILED DESCRIPTION

The embodiments of the present disclosure are described in detail below. Examples of the embodiments are shown in the accompanying drawing, throughout which the same or similar labels indicate the same or similar components or components with the same or similar functions. The embodiments described below with reference to the accompanying drawings are exemplary, and are intended to explain the disclosure, but should not be understood as a limitation to the disclosure.

The terminal device in the embodiments of the disclosure is an entity for receiving or transmitting a signal at a user side, for example, a mobile phone. The terminal device may be referred to as a terminal, a user equipment (UE), a mobile station (MS), a mobile terminal (MT), etc. The terminal device may be an automobile with a communication function, a smart automobile, a mobile phone, a wearable device, a tablet computer (Pad), a computer with a wireless transceiving function, a virtual reality (VR) terminal device, an augmented reality (AR) terminal device, a wireless terminal device in industrial control, a wireless terminal device in self-driving, a wireless terminal device in a remote medical surgery, a wireless terminal device in a smart grid, a wireless terminal device in transportation safety, a wireless terminal device in a smart home, etc. A specific technology adopted by the terminal device and a specific device form adopted by the terminal device are not limited in the embodiments of the present disclosure.

It should be noted that, for a downlink semi-persistent scheduling (SPS) configuration, the network device configures a transmission period of a downlink SPS resource in a semi-static manner via a radio resource control (RRC) message. The network device indicates to activate the downlink SPS resource via the DCI. The DCI for activating the downlink SPS resource also indicates a time position of HARQ process feedback information that needs to be provided by the terminal device for a data channel receiving the downlink SPS resource. For example, as illustrated in FIG. 1, when the DCI activates the SPS configuration, the terminal device receives a physical downlink shared channel (PDSCH) of the SPS at a time position t1, and transmits HARQ process feedback information of the PDSCH channel at the time t1, at a time position of t1+K1 (i.e., a PUCCH-1 at a time tx) based on K1 information indicated in the DCI.

Figure 1:
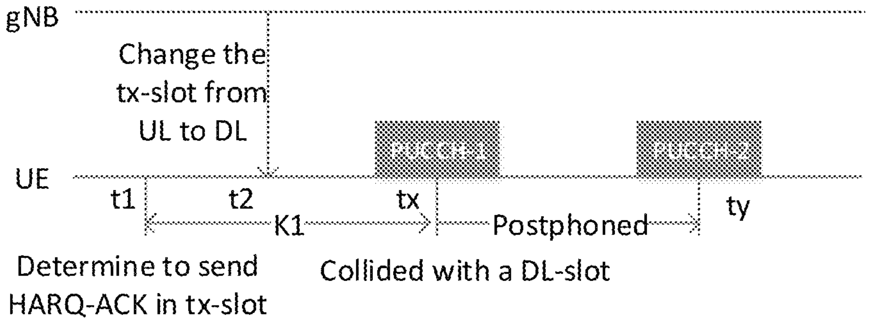
FIG. 1 is a diagram illustrating a transmission of a HARQ process feedback is postponed according to an embodiment of the disclosure.

However, since the network device may change a configuration ratio of an uplink transmission slot/subframe to a downlink transmission slot (or a subframe), the moment tx may correspond to one downlink slot (or subframe), then the terminal device needs to postpone the HARQ process feedback information to a next time resource position where the HARQ process feedback information may be transmitted, for example, a PUCCH-2 at a time ty illustrated in FIG. 1.

Figure 2:
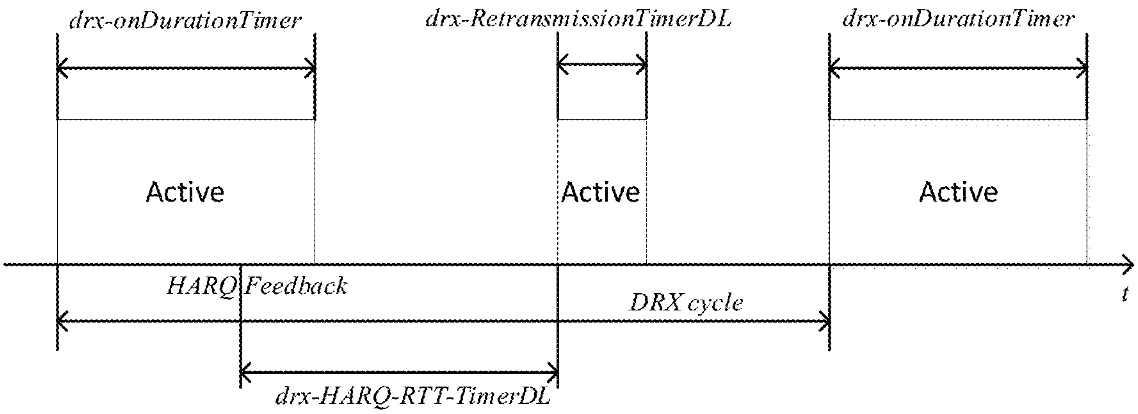
FIG. 2 is a diagram illustrating a DRX configuration for DRX of a downlink control channel according to an embodiment of the disclosure.

In order to save powers of the terminal device, the network device may configure a discontinuous reception (DRX) of a downlink control channel (i.e., a DRX configuration) for the terminal device. As illustrated in FIG. 2, in the DRX configuration, a drx-HARQ-RTT-TimerDL and a drx-RetransmissionTimerDL are included. After receiving the PDSCH, the terminal device may transmit HARQ process feedback information indicating whether decoding succeeds or fails based on a data reception condition of the PDSCH, for example, a HARQ feedback as illustrated in FIG. 2. The terminal device starts a downlink RTT timer at an end position of transmitting the feedback information time resource, and when the downlink RTT timer expires, if data of the HARQ process fails to be decoded, the terminal device starts a downlink retransmission timer. During running of the downlink retransmission timer, the terminal device needs to be in an active state to receive data retransmission scheduling information of the downlink control channel.

However, when a transmission time of a HARQ process feedback of a downlink SPS resource of the terminal device is postponed from the first resource (such as the PUCCH-1) to the second resource (such as the PUCCH-2), considering from the perspective of the terminal device, there are two available transmission resources at the transmission time position of the HARQ process feedback, and a time position at which the terminal device starts the downlink RTT timer may be a transmission end time position of the first resource or the second resource. However, the network device and the terminal device cannot remain consistent with understanding of when to start a downlink HARQ RTT timer, causing that an actual DRX activation time of the terminal device is inconsistent with a DRX activation time of the terminal device understood by the network device, so that data retransmission scheduling information of the downlink control channel of the terminal device fails to be received.

For the above problems, a method and an apparatus for processing a DRX, a terminal device and a storage medium are provided, so that when the transmission of the HARQ process feedback of the terminal device is postponed, it ensures that the network device may still transmit data retransmission scheduling information at the DRX activation time of the terminal device, which thus improves the reliability of data transmission. The terminal device may be understood as a terminal in the embodiments of the disclosure, and may be a reduced capability (Reducap) terminal. The terminal device may be a transmitter in a communication scenario. The transmitter may be understood as a signal transmitter. As an example, the transmitter may be understood as the initiator of random access. The transmitter may be one of terminal devices such as a mobile phone and a wearable device, or, the transmitter may also be one of terminal devices used in Internet of Things (IoT) service such as a smart home device, a video surveillance equipment and an industrial sensing and monitoring equipment.

A method and an apparatus for processing a DRX, a terminal device and a storage medium in the embodiments of the present disclosure are described referring to figures.

Figure 3:
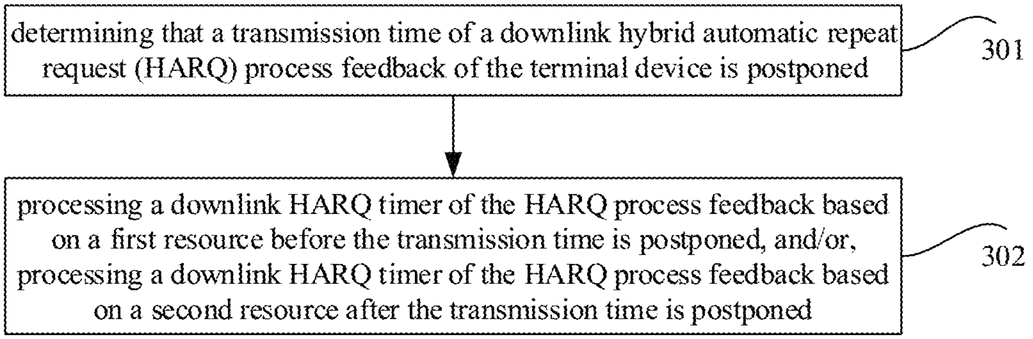
FIG. 3 is a flowchart illustrating a method for processing a DRX according to an embodiment of the disclosure.

For convenience of description, a method for processing a DRX in the embodiments of the disclosure is illustrated below at a terminal device side. FIG. 3 is a flowchart illustrating a method for processing a DRX according to an embodiment of the disclosure. The method may be performed by a terminal device. As illustrated in FIG. 3, the method for processing a DRX may include the following steps.

At step 301, it is determined that a transmission time of a HARQ process feedback of the terminal device is postponed.

It should be noted that, in order to save powers of the terminal device, the network device may configure a DRX of a downlink control channel (i.e., a DRX configuration) for the terminal device. As illustrated in FIG. 2, in the DRX configuration, a drx-HARQ-RTT-TimerDL and a drx-RetransmissionTimerDL are included. The terminal device may perform the DRX of the downlink control channel based on the DRX configuration. In order to ensure consistent understandings of the network device and the terminal device for when to start the downlink RTT timer, it may be determined whether the transmission time of the downlink HARQ process feedback of the terminal device is postponed, and when the transmission time of the downlink HARQ process feedback of the terminal device is postponed, the downlink HARQ timer of the HARQ process feedback needs to be processed.

In some embodiments of the disclosure, a trigger condition of the transmission time of the downlink HARQ process feedback being postponed includes any one of the following conditions.

1) A transmission time position of the downlink HARQ process feedback is a transmission time position of a downlink resource configured by a network device.

For example, the transmission time position of the downlink HARQ process feedback completely coincides or partially coincides with the transmission time position of the downlink resource configured by the network device.

2) The terminal device fails to access a channel at the transmission time position of the downlink HARQ process feedback.

For example, for an unlicensed frequency band, the terminal device needs to detect whether the frequency band is idle before transmitting a signal, and for example, in a channel access, when the terminal device detects that the frequency band is not idle at the transmission time position of the downlink HARQ process feedback, the terminal device needs to postpone the transmission time position of the downlink HARQ process feedback.

3) Indication information transmitted by a network device is received, in which the indication information is configured to indicate that the transmission time of the downlink HARQ process feedback is postponed.

For example, as illustrated in FIG. 1, the terminal device determines that the transmission time of the downlink HARQ process feedback is tx at the moment t1, and the terminal device receives DCI sent by the network device at the moment t2, indicating that the transmission time of the downlink HARQ process feedback is postponed to ty. In this case, the terminal device postpones the transmission time of the downlink HARQ process feedback to ty based on the network indication.

4) The transmission time position of the downlink HARQ process feedback collides with transmission of a high-priority signal.

For example, as illustrated in FIG. 1, the terminal needs to transmit “the downlink HARQ process feedback” and “scheduling request information” at the time tx. However, “the downlink HARQ process feedback” and “scheduling request information” are unable to be transmitted simultaneously due to a limited processing capacity. A priority of “the downlink HARQ process feedback” is lower to that of “scheduling request information” based on a network configuration or a protocol agreement, and the terminal device postpones the transmission time position of the downlink HARQ process feedback.

For another example, as illustrated in FIG. 1, the terminal needs to transmit “the downlink HARQ process feedback” and “a high-priority data signal” at the time tx. However, “the downlink HARQ process feedback” and “the high-priority data signal” are unable to be transmitted simultaneously due to a limited processing capacity. The priority of “the downlink HARQ process feedback” is lower to that of “the high-priority data signal” based on the network configuration or the protocol agreement, and the terminal device postpones the transmission time position of the downlink HARQ process feedback.

5) An uplink transmission power of the terminal device fails to transmit the downlink HARQ process feedback.

For example, as illustrated in FIG. 1, the terminal device needs to transmit “the downlink HARQ process feedback” for an Scell-1 and “scheduling request information” for a Pcell at the time tx. However, when the terminal device sends the “scheduling request information” for the Pcell, there is no extra transmission power left to transmit “the downlink HARQ process feedback” for the Scell-1, and the terminal device postpones the transmission time position of the downlink HARQ process feedback.

That is, when the transmission time position of the downlink HARQ process feedback is the transmission time position of the downlink resource configured by the network device, or when the terminal device fails to access a channel at the transmission time position of the downlink HARQ process feedback, or when the terminal device receives indication information transmitted by the network device configured to indicate that the transmission time of the downlink HARQ process feedback is postponed, or when the transmission time position of the downlink HARQ process feedback collides with the transmission of the high-priority signal, or when the uplink transmission power of the terminal device fails to transmit the downlink HARQ process feedback, the terminal device needs to postpone the downlink HARQ timer of the HARQ process feedback, and needs to process the downlink HARQ timer of the HARQ process feedback, to ensure that the network device transmits the data retransmission scheduling information at the DRX activation time of the terminal device, which thus improves the reliability of data transmission.

In some embodiments of the disclosure, a type of a downlink data channel corresponding to the HARQ process feedback is a SPS downlink data channel. That is, the type of the downlink data channel corresponding to the downlink HARQ feedback type being postponed is the SPS downlink data channel.

At step 302, a downlink HARQ timer of the HARQ process feedback is processed based on a first resource before the transmission time is postponed, and/or, a downlink HARQ timer of the HARQ process feedback is processed based on a second resource after the transmission time is postponed.

It should be noted that, the network device may configure a DRX of a downlink control channel (i.e., a DRX configuration) for the terminal device, and a downlink HARQ RTT timer configuration and a downlink HARQ retransmission timer configuration are included in the DRX configuration. It can be seen that the downlink HARQ timer may be a downlink HARQ RTT timer and/or a downlink HARQ retransmission timer.

Optionally, when it is determined that the transmission time of the downlink HARQ process feedback of the terminal device is postponed, the terminal device may process the downlink HARQ RTT timer of the HARQ process feedback based on the first resource before the transmission time is postponed, or the terminal device may process the downlink HARQ RTT timer of the HARQ process feedback based on the second resource after the transmission time is postponed. For another example, when it is determined that the transmission time of the downlink HARQ process feedback of the terminal device is postponed, the terminal device may process the downlink HARQ RTT timer of the HARQ process feedback based on the first resource before the transmission time is postponed and the second resource after the transmission time is postponed. For another example, when it is determined that the transmission time of the downlink HARQ process feedback of the terminal device is postponed, the terminal device may process the downlink HARQ RTT timer and the downlink HARQ retransmission timer of the HARQ process feedback based on both the first resource before the transmission time is postponed and the second resource after the transmission time is postponed. For another example, when it is determined that the transmission time of the downlink HARQ process feedback of the terminal device is postponed, the terminal device may process the downlink HARQ retransmission timer of the HARQ process feedback based on the second resource after the transmission time is postponed.

In order to facilitate understanding the present disclosure, when the transmission time of the downlink HARQ process feedback of the terminal device is postponed, how the terminal device processes a downlink timer of the HARQ process feedback is described in combination with the following examples.

Example 1

Processing the downlink HARQ timer of the HARQ process feedback based on the first resource before the transmission time of the downlink HARQ process feedback is postponed, includes: starting the downlink HARQ RTT timer of the HARQ process feedback behind a transmission end position of the first resource.

Figure 4:
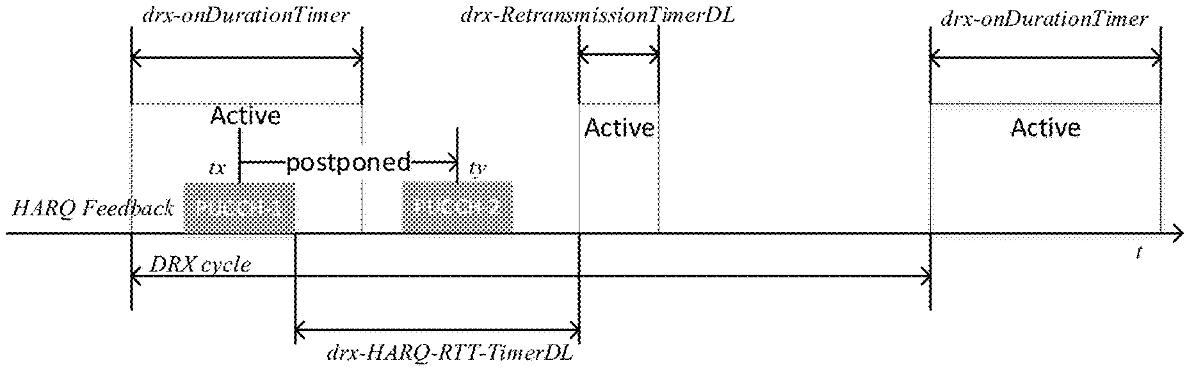
FIG. 4 is a diagram illustrating a method for processing a DRX according to an embodiment of the present disclosure.

Optionally, after the transmission time of the downlink HARQ process feedback of the terminal device is postponed, the terminal device may start the downlink HARQ RTT timer of the HARQ process feedback behind a transmission end position of the first resource before the transmission time is postponed. For example, as illustrated in FIG. 4, a PUCCH-1 is the first resource before the transmission time is postponed, a PUCCH-2 is the second resource after the transmission time is postponed, and when the transmission time of the downlink HARQ process feedback of the terminal device is postponed, the terminal device starts the downlink HARQ RTT timer (such as drx-HARQ-RTT-TimerDL) of the HARQ feedback at the first symbol position behind the transmission end position of the PUCCH-1.

Example 2

Processing the downlink HARQ timer of the HARQ process feedback based on the second resource after the transmission time of the downlink HARQ process feedback is postponed, includes: starting the downlink HARQ RTT timer of the HARQ process feedback behind a transmission end position of the second resource.

Figure 5:
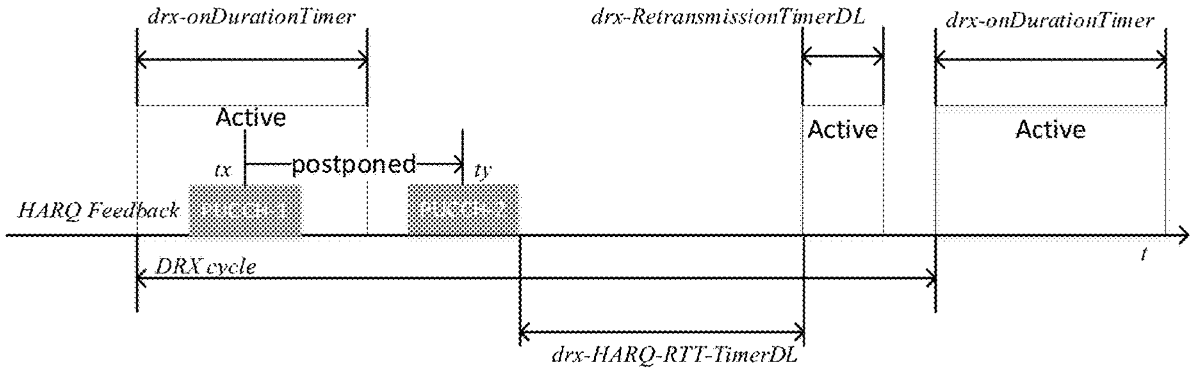
FIG. 5 is a diagram illustrating a method for processing a DRX according to an embodiment of the present disclosure.

Optionally, after the transmission time of the downlink HARQ process feedback of the terminal device is postponed, the terminal device may start the downlink HARQ RTT timer of the HARQ process feedback behind a transmission end position of the second resource after the transmission time is postponed. For example, as illustrated in FIG. 5, a PUCCH-1 is the first resource before the transmission time is postponed, a PUCCH-2 is the second resource after the transmission time is postponed, and when the transmission time of the downlink HARQ process feedback of the terminal device is postponed, the terminal device starts the downlink HARQ RTT timer (such as drx-HARQ-RTT-TimerDL) of the HARQ feedback at a first symbol position behind the transmission end position of the PUCCH-2.

Example 3

Processing the downlink HARQ timer of the HARQ process feedback based on the first resource before the transmission time of the downlink HARQ process feedback is postponed and the second position after the transmission time is postponed, includes: determining a start position of a downlink HARQ retransmission timer corresponding to a downlink HARQ RTT timer, which is started at a transmission end position of the first resource; and comparing the start position of the downlink HARQ retransmission timer with a transmission position of the second resource, and determining a start position of the downlink HARQ RTT timer based on a comparison result.

As an example, the downlink HARQ RTT timer of the HARQ process feedback may be started behind the transmission end position of the first resource in response to the start position of the downlink HARQ retransmission timer being behind the transmission position of the second resource; or, the downlink HARQ RTT timer of the HARQ process feedback may be started behind the transmission end position of the second resource in response to the start position of the downlink HARQ retransmission timer preceding or at least partially coinciding (for example, partially coinciding or completely coinciding) with the transmission position of the second resource.

Optionally, after the transmission time of the downlink HARQ process feedback of the terminal device is postponed, the terminal device determines, based on a transmission end position of the first resource before the transmission time is postponed, a start position of the downlink HARQ retransmission timer corresponding to the downlink HARQ RTT timer of the HARQ process feedback started at the transmission end position of the first resourcebefore the transmission time is postponed. The terminal device may start the downlink HARQ RTT timer of the HARQ process feedback behind the transmission end position of the first resource in response to the start position of the downlink HARQ retransmission timer being behind the transmission position of the second resource after the transmission time is postponed. The terminal device may start the downlink HARQ RTT timer of the HARQ process feedback behind the transmission end position of the second resource in response to the start position of the downlink HARQ retransmission timer preceding or at least partially coinciding with the transmission position of the second resource after the transmission time is postponed.

Example 4

Processing the downlink HARQ timer of the HARQ process feedback based on the first resource before the transmission time of the downlink HARQ process feedback is postponed and the second resource after the transmission time is postponed, includes: starting the downlink HARQ RTT timer of the HARQ process feedback behind the transmission end position of the first resource; and restarting the downlink HARQ RTT timer of the HARQ process feedback behind the transmission end position of the second resource.

Figure 6:
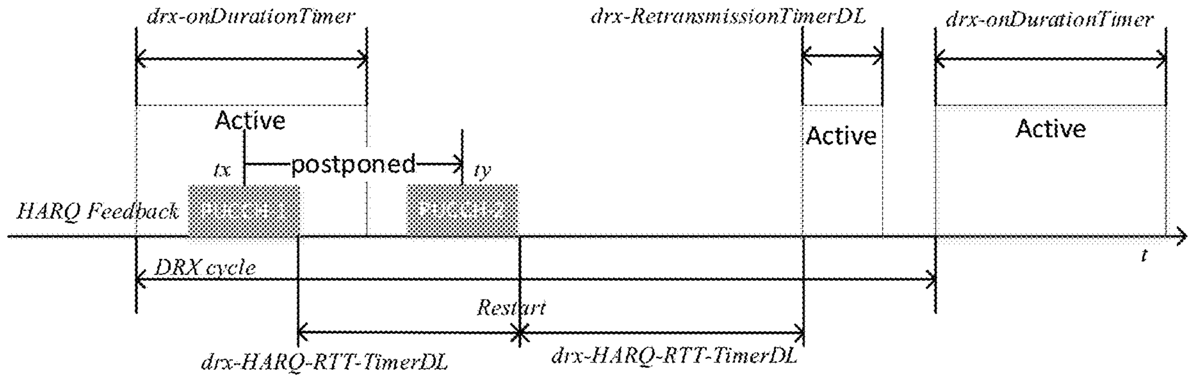
FIG. 6 is a diagram illustrating a method for processing a DRX according to an embodiment of the present disclosure.

Optionally, after the transmission time of the downlink HARQ process feedback of the terminal device is postponed, the terminal device may start the downlink HARQ RTT timer of the HARQ process feedback behind the transmission end position of the first resource before the transmission time is postponed. Then, the downlink HARQ RTT timer of the HARQ process feedback is restarted behind the transmission end position of the second resource after the transmission time is postponed. For example, as illustrated in FIG. 6, a PUCCH-1 is the first resource before the transmission time is postponed, a PUCCH-2 is the second resource after the transmission time is postponed, and when the transmission time of the downlink HARQ process feedback of the terminal device is postponed, the terminal device starts a downlink HARQ RTT timer (such as "drx-HARQ-RTT-TimerDL") of the HARQ feedback at a first symbol position behind the transmission end position of the PUCCH-1. Then, the terminal device restarts the downlink HARQ RTT timer "drx-HARQ-RTT-TimerDL" of the HARQ feedback at the first symbol position behind the transmission end position of the PUCCH-2.

Example 5

Processing the downlink HARQ timer of the HARQ process feedback based on the first resource before the transmission time of the downlink HARQ process feedback is postponed and the second resource after the transmission time is postponed, includes: starting a first downlink HARQ RTT timer of the HARQ process feedback behind the transmission end position of the first resource; starting a second downlink HARQ RTT timer of the HARQ process feedback behind the transmission end position of the second resource; starting a first downlink HARQ retransmission timer after the first downlink HARQ RTT timer expires; and starting a second downlink HARQ retransmission timer after the second downlink HARQ RTT timer expires.

Optionally, after the transmission time of the downlink HARQ process feedback of the terminal device is postponed, the terminal device may start the first downlink HARQ RTT timer of the HARQ process feedback behind the transmission end position of the first resource before the transmission time is postponed. The second downlink HARQ RTT timer of the HARQ process feedback is restarted behind the transmission end position of the second resource after the transmission time is postponed. The first downlink HARQ retransmission timer is started after the first downlink HARQ RTT timer expires, and the second downlink HARQ retransmission timer is started after the second downlink HARQ RTT timer expires.

Figure 7:
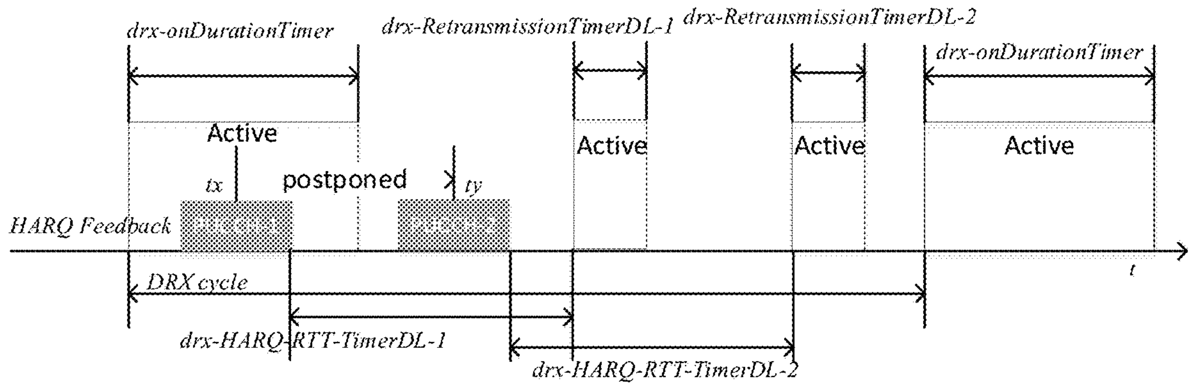
FIG. 7 is a diagram illustrating a method for processing a DRX according to an embodiment of the present disclosure.

For example, as illustrated in FIG. 7, a PUCCH-1 is the first resource before the transmission time is postponed, a PUCCH-2 is the second resource after the transmission time is postponed, and when the transmission time of the downlink HARQ process feedback of the terminal device is postponed, the terminal device starts the first downlink HARQ RTT timer “drx-HARQ-RTT-TimerDL-1” of the HARQ process feedback at the first symbol position behind the transmission end position of the PUCCH-1, and starts the first downlink HARQ retransmission timer “drx-RetransmissionTimerDL-1” when the first downlink HARQ RTT timer “drx-HARQ-RTT-TimerDL-1” expires. Then, the terminal device restarts the second downlink HARQ RTT timer “drx-HARQ-RTT-TimerDL-2” at the first symbol position behind the transmission end position of the PUCCH-2, and starts the second downlink HARQ retransmission timer “drx-RetransmissionTimerDL-2” when the second downlink HARQ RTT timer “drx-HARQ-RTT-TimerDL-2” expires.

Example 6

Processing the downlink HARQ of the HARQ process feedback based on the second resource of the downlink HARQ process feedback is postponed, includes: starting a downlink HARQ retransmission timer of the HARQ process feedback behind a transmission end position of the second resource.

Figure 8:
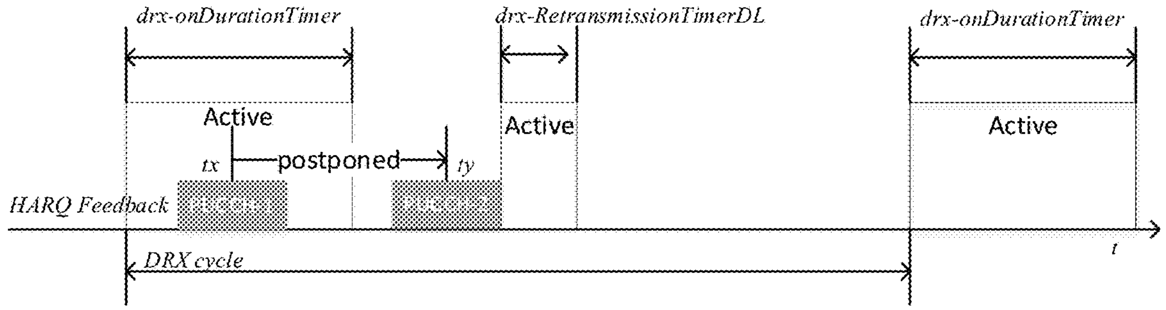
FIG. 8 is a diagram illustrating a method for processing a DRX according to an embodiment of the present disclosure.

Optionally, after the transmission time of the downlink HARQ process feedback of the terminal device is postponed, the terminal device may start the downlink HARQ retransmission timer of the HARQ process feedback behind a transmission end position of the second resource after the transmission time is postponed. For example, as illustrated in FIG. 8, a PUCCH-1 is the first resource before the transmission time is postponed, a PUCCH-2 is the second resource after the transmission time is postponed, and when the transmission time of the downlink HARQ process feedback of the terminal device is postponed, the terminal device starts the downlink HARQ retransmission timer of the HARQ feedback at the first symbol position behind the transmission end position of the PUCCH-2. That is, in this case, the terminal device is disabled to start the downlink HARQ RTT timer of the HARQ process feedback.

That is, after the downlink HARQ process feedback of the terminal device is postponed, the terminal device may process the “downlink HARQ RTT timer” and/or the “downlink HARQ retransmission timer” of the HARQ process feedback based on the “first resource before the transmission time is postponed” and/or the “second resource after the transmission time is postponed” transmitted by the downlink HARQ process feedback. For the network device, when the downlink HARQ process feedback of the terminal device is postponed, the network device may determine a processing mode of the “downlink HARQ RTT timer” and/or the “downlink HARQ retransmission timer” based on an agreement with the terminal device. The processing mode includes that the terminal device processes the “downlink HARQ RTT timer” of the HARQ process based on the “first resource before the transmission time is postponed” and/or the “second resource after the transmission time is postponed” transmitted by the downlink HARQ process feedback.

According to the method for processing a DRX in the embodiments of the disclosure, when it is determined that the transmission time of the downlink HARQ process feedback of the terminal device is postponed, the terminal device processes the downlink HARQ timer of the HARQ process feedback based on the first resource before the transmission time is postponed, and/or, processes the downlink HARQ timer of the HARQ process feedback based on the second resource after the transmission time is postponed. Therefore, when the transmission of the HARQ process feedback of the terminal device is postponed, the disclosure ensures that the network device may still transmit the data retransmission scheduling information at the DRX activation time of the terminal device, which thus improves the reliability of data transmission.

Figure 9:
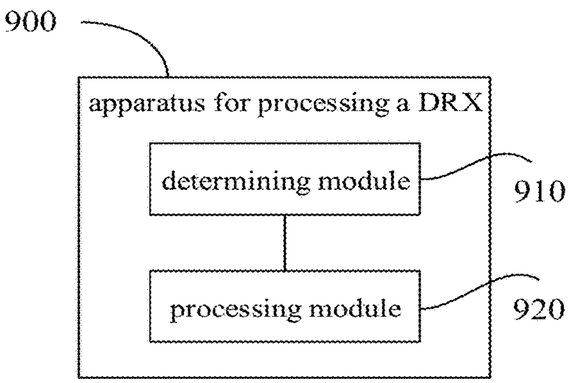
FIG. 9 is a structural diagram illustrating an apparatus for processing a DRX according to the disclosure.

Corresponding to the method for processing a DRX according to the above embodiments, an apparatus for processing a DRX is further provided. Since the apparatus for processing a DRX according to the embodiments of the present disclosure corresponds to the method for processing a DRX according to the above embodiments of the present disclosure, the implementations of the method for processing a DRX are also applicable to the apparatus for processing a DRX according to the embodiment, which will not be described in the embodiments. FIG. 9 is a structural diagram illustrating an apparatus for processing a DRX according to the disclosure. The apparatus for processing a DRX may be performed by a terminal device. As illustrated in FIG. 9, the apparatus 900 for processing a DRX may include a determining module 910 and a processing module 920.

The determining module 910 is configured to determine that a transmission time of a downlink hybrid automatic repeat request (HARQ) process feedback of the terminal device is postponed.

In some embodiments of the disclosure, a trigger condition of the transmission time of the downlink HARQ process feedback being postponed includes any one of: a transmission time position of the downlink HARQ process feedback being a transmission time position of a downlink resource configured by a network device; the terminal device failing to access a channel at the transmission time position of the downlink HARQ process feedback; receiving indication information transmitted by a network device, in which the indication information is configured to indicate that the transmission time of the downlink HARQ process feedback is postponed; the transmission time position of the downlink HARQ process feedback colliding with transmission of a high-priority signal; or an uplink transmission power of the terminal device failing to transmit the downlink HARQ process feedback.

Optionally, in the embodiments of the disclosure, a type of a downlink data channel corresponding to the HARQ process feedback is a semi-persistent scheduling (SPS) downlink data channel.

The processing module 920 is configured to process a downlink HARQ timer of the HARQ process feedback based on a first resource before the transmission time is postponed, and/or, process a downlink HARQ timer of the HARQ process feedback based on a second resource after the transmission time is postponed.

In some embodiments of the present disclosure, when it is determined that the transmission time of the downlink HARQ process feedback of the terminal device is postponed, the processing module 920 may process the downlink HARQ RTT timer of the HARQ process feedback based on the first resource before the transmission time is postponed, or the terminal device may process the downlink HARQ RTT timer of the HARQ process feedback based on the second resource after the transmission time is postponed. For another example, when it is determined that the transmission time of the downlink HARQ process feedback of the terminal device is postponed, the processing module 920 may process the downlink HARQ RTT timer of the HARQ process feedback based on the first resource before the transmission time is postponed and the second resource after the transmission time is postponed. For another example, when it is determined that the transmission time of the downlink HARQ process feedback of the terminal device is postponed, the processing module 920 may process the downlink HARQ RTT timer and the downlink HARQ retransmission timer of the HARQ process feedback based on the first resource before the transmission time is postponed and the second resource after the transmission time is postponed. For example, when it is determined that the transmission time of the downlink HARQ process feedback of the terminal device is postponed, the processing module 920 may process the downlink HARQ retransmission timer of the HARQ process feedback based on the second resource after the transmission time is postponed.

In order to facilitate understanding the present disclosure, when the transmission time of the downlink HARQ process feedback of the terminal device is postponed, the following examples describe how the processing module 920 processes a downlink timer of the HARQ process feedback:

Example 1

The processing module 920 processes the downlink HARQ timer of the HARQ process feedback based on the first resource before the transmission time of the downlink HARQ process feedback is postponed, which includes: starting the downlink HARQ RTT timer of the HARQ process feedback behind a transmission end position of the first resource.

Optionally, after the transmission time of the downlink HARQ process feedback of the terminal device is postponed, the processing module 920 may start the downlink HARQ RTT timer of the HARQ process feedback behind the transmission end position of the first resource before the transmission time is postponed. For example, as illustrated in FIG. 4, a PUCCH-1 is the first resource before the transmission time is postponed, a PUCCH-2 is the second resource after the transmission time is postponed, and when the transmission time of the downlink HARQ process feedback of the terminal device is postponed, the processing module 920 starts the downlink HARQ RTT timer (such as drx-HARQ-RTT-TimerDL) of the HARQ feedback at the first symbol position behind the transmission end position of the PUCCH-1.

Example 2

The processing module 920 processes the downlink HARQ timer of the HARQ process feedback based on the second resource after the transmission time of the downlink HARQ process feedback is postponed, which includes starting the downlink HARQ RTT timer of the HARQ process feedback behind a transmission end position of the second resource.

Optionally, after the transmission time of the downlink HARQ process feedback of the terminal device is postponed, the processing module 920 may start the downlink HARQ RTT timer of the HARQ process feedback behind the transmission end position of the second resource after the transmission time is postponed. For example, as illustrated in FIG. 5, a PUCCH-1 is the first resource before the transmission time is postponed, a PUCCH-2 is the second resource after the transmission time is postponed, and when the transmission time of the downlink HARQ process feedback of the terminal device is postponed, the processing module 920 starts the downlink HARQ RTT timer (such as drx-HARQ-RTT-TimerDL) of the HARQ feedback at the first symbol position behind the transmission end position of the PUCCH-2.

Example 3

The processing module 920 processes the downlink HARQ timer of the HARQ process feedback based on the first resource before the transmission time of the downlink HARQ process feedback is postponed and the second position after the transmission time is postponed, which includes determining a start position of a downlink HARQ retransmission timer corresponding to a downlink HARQ RTT timer, which is started at a transmission end position of the first resource; and comparing the start position of the downlink HARQ retransmission timer with a transmission position of the second resource, and determining a start position of the downlink HARQ RTT timer based on a comparison result.

As an example, the downlink HARQ RTT timer of the HARQ process feedback may be started behind the transmission end position of the first resource in response to the start position of the downlink HARQ retransmission timer being behind the transmission position of the second resource; or, the downlink HARQ RTT timer of the HARQ process feedback may be started behind the transmission end position of the second resource in response to the start position of the downlink HARQ retransmission timer preceding or at least partially coinciding (for example, partially coinciding or completely coinciding) with the transmission position of the second resource.

Optionally, after the transmission time of the downlink HARQ process feedback of the terminal device is postponed, the processing module 920 may determine, based on a transmission end position of the first resource before the transmission time is postponed, a start position of the downlink HARQ retransmission timer corresponding to the downlink HARQ RTT timer of the HARQ process feedback started at the transmission end position of the first resource before the transmission time is postponed. The processing module 920 may start the downlink HARQ RTT timer of HARQ process feedback behind the transmission end position of the first resource in response to the start position of the downlink HARQ retransmission timer being behind the transmission position of the second resource after the transmission time is postponed. The processing module 920 may start the downlink HARQ RTT timer of the HARQ process feedback behind the transmission end position of the second resource in response to the start position of the downlink HARQ retransmission timer preceding or at least partially coinciding with the transmission position of the second resource after the transmission time is postponed.

Example 4

The processing module 920 processes the downlink HARQ timer of the HARQ process feedback based on the first resource before the transmission time of the downlink HARQ process feedback is postponed and the second resource after the transmission time is postponed, which includes: starting the downlink HARQ RTT timer of the HARQ process feedback behind a transmission end position of the first resource; and restarting the downlink HARQ RTT timer of the HARQ process feedback behind the transmission end position of the second resource.

Optionally, after the transmission time of the downlink HARQ process feedback of the terminal device is postponed, the processing module 920 may start the downlink HARQ RTT timer of the HARQ process feedback at the transmission end position of the first resource before the transmission time is postponed. Then, the downlink HARQ RTT timer of the HARQ process feedback is restarted behind the transmission end position of the second resource after the transmission time is postponed. For example, as illustrated in FIG. 6, a PUCCH-1 is a first resource before the transmission time is postponed, a PUCCH-2 is a second resource after the transmission time is postponed, and when the transmission time of the downlink HARQ process feedback of the terminal device is postponed, the processing module 920 starts the downlink HARQ RTT timer (such as "drx-HARQ-RTT-TimerDL") of the HARQ feedback at the first symbol position behind the transmission end position of the PUCCH-1. Then, the processing module 920 restarts the downlink HARQ RTT timer "drx-HARQ-RTT-TimerDL" of the HARQ feedback at the first symbol position behind the transmission end position of the PUCCH-2.

Example 5

The processing module 920 processes the downlink HARQ timer of the HARQ process feedback based on the first resource before the transmission time of the downlink HARQ process feedback is postponed and the second resource after the transmission time is postponed, which includes: starting a first downlink HARQ RTT timer of the HARQ process feedback behind the transmission end position of the first resource; starting a second downlink HARQ RTT timer of the HARQ process feedback behind the transmission end position of the second resource; starting a first downlink HARQ retransmission timer after the first downlink HARQ RTT timer expires; and starting a second downlink HARQ retransmission timer after the second downlink HARQ RTT timer expires.

Optionally, after the transmission time of the downlink HARQ process feedback of the terminal device is postponed, the processing module 920 may start the first downlink HARQ RTT timer of the HARQ process feedback at the transmission end position of the first resource before the transmission time is postponed. The second downlink HARQ RTT timer of the HARQ process feedback is restarted behind the transmission end position of the second resource after the transmission time is postponed. The first downlink HARQ retransmission timer is started after the first downlink HARQ RTT timer expires, and the second downlink HARQ retransmission timer is started after the second downlink HARQ RTT timer expires.

For example, as illustrated in FIG. 7, a PUCCH-1 is the first resource before the transmission time is postponed, a PUCCH-2 is the second resource after the transmission time is postponed, and when the transmission time of the downlink HARQ process feedback of the terminal device is postponed, the processing module 920 starts the first downlink HARQ RTT timer "drx-HARQ-RTT-TimerDL-1" of the HARQ process feedback at the first symbol position behind the transmission end position of the PUCCH-1, and starts the first downlink HARQ retransmission timer "drx-RetransmissionTimerDL-1" when the first downlink HARQ RTT timer "drx-HARQ-RTT-TimerDL-1" expires. Then, the processing module 920 restarts the second downlink HARQ RTT timer "drx-HARQ-RTT-TimerDL-2" at the first symbol position behind the transmission end position of the PUCCH-2, and starts the second downlink HARQ retransmission timer "drx-RetransmissionTimerDL-2" when the second downlink HARQ RTT timer "drx-HARQ-RTT-TimerDL-2" expires.

Example 6

The processing module 920 processes the downlink HARQ timer of the HARQ process feedback based on the second resource after the transmission time of the downlink HARQ process feedback is postponed, which includes starting the downlink HARQ retransmission timer of the HARQ process feedback behind a transmission end position of the second resource.

Optionally, after the transmission time of the downlink HARQ process feedback of the terminal device is postponed, the processing module 920 may start the downlink HARQ retransmission timer of the HARQ process feedback behind a transmission end position of the second resource after the transmission time is postponed. For example, as illustrated in FIG. 8, a PUCCH-1 is the first resource before the transmission time is postponed, a PUCCH-2 is the second resource after the transmission time is postponed, and when the transmission time of the downlink HARQ process feedback of the terminal device is postponed, the processing module 920 starts the downlink HARQ retransmission timer of the HARQ feedback at the first symbol position behind the transmission end position of the PUCCH-2. That is, in this case, the terminal device is disabled to start the downlink HARQ RTT timer of the HARQ process feedback.

That is, after the downlink HARQ process feedback of the terminal device is postponed, the terminal device may process the "downlink HARQ RTT timer" and/or the "downlink HARQ retransmission timer" of the HARQ process based on the "first resource before the transmission time is postponed" and/or the "second resource after the transmission time is postponed" transmitted by the downlink HARQ process feedback. For the network device, when the downlink HARQ process feedback of the terminal device is postponed, the network device may determine a processing mode of the "downlink HARQ RTT timer" and/or the "downlink HARQ retransmission timer" based on an agreement with the terminal device. The processing mode includes that the terminal device processes the "downlink HARQ RTT timer" of the HARQ process based on the "first resource before the transmission time is postponed" and/or the "second resource after the transmission time is postponed" transmitted by the downlink HARQ process feedback.

According to the apparatus for processing a DRX in the embodiments of the disclosure, when it is determined that the transmission time of the downlink HARQ process feedback of the terminal device is postponed, the terminal device processes the downlink HARQ timer of the HARQ process feedback based on the first resource before the transmission time is postponed, and/or, processes the downlink HARQ timer of the HARQ process feedback based on the second resource after the transmission time is postponed. Therefore, when the transmission of the HARQ process feedback of the terminal device is postponed, the disclosure ensures that the network device may still transmit the data retransmission scheduling information at the DRX activation time of the terminal device, which thus improves the reliability of data transmission.

According to the embodiments of the present disclosure, a terminal device and a readable storage medium are further provided in the embodiments of the present disclosure.

Figure 10:
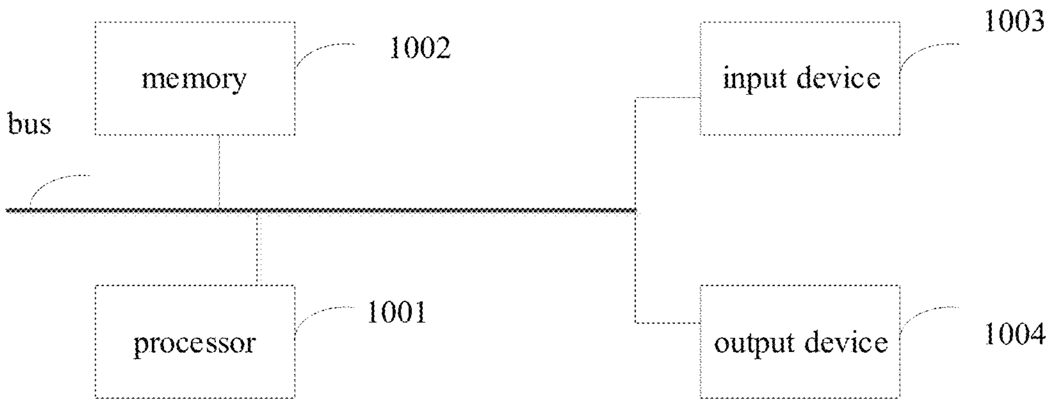
FIG. 10 is a block diagram illustrating a terminal device configured to implement the method for processing a DRX according to the embodiments of the disclosure.

As illustrated in FIG. 10, FIG. 10 is a block diagram illustrating a terminal device configured to implement the method for processing a DRX according to the embodiments of the present disclosure. The terminal device is intended to represent various types of digital computers, such as laptop computers, desktop computers, workstations, personal digital assistants, servers, blade servers, mainframe computers, and other suitable computers. The terminal device may also represent various types of mobile devices, such as personal digital assistants, cellular phones, smart phones, wearable devices, and other similar computing devices. The components shown herein, their connections and relations, and their functions are merely used as examples, which are not intended to limit the implementation of the disclosure described and/or required herein.

As illustrated in FIG. 10, the terminal device includes: one or more processors 1001, a memory 1002, and interfaces configured to connect various components, including a high-speed interface and a low-speed interface. The various components are connected to each other with different buses, and may be installed on a public main board or installed in other ways as needed. The processor may process instructions executed in the terminal device, including instructions stored in or on the memory to display graphical information of the GUI on an external input/output device (such as a display device coupled to the interface). In other implementations, a plurality of processors and/or a plurality of buses may be used together with a plurality of memories if necessary. Similarly, the processor may be connected with a plurality of terminal devices, and each device provides a part of necessary operations (for example, as a server array, a set of blade servers, or a multi-processor system). FIG. 10 takes one processor 1001 as an example.

The memory 1002 is a non-transitory computer-readable storage medium according to the present disclosure. The memory stores instructions executable by at least one processor, to cause the at least one processor to perform the method for processing a DRX according to the present disclosure. The non-transitory computer-readable storage medium of the present disclosure stores computer instructions, and the computer instructions are configured to perform the method for processing a DRX according to the present disclosure.

As a non-transitory computer-readable storage medium, the memory 1002 may be configured to store non-transitory software programs, non-transitory computer-executable programs and modules, such as program instructions/modules corresponding to the method for processing a DRX in the embodiments of the present disclosure. The processor 1001 executes various functional applications and data processing of the server by running the non-transitory software programs instructions, and modules stored in the memory 1002, that is, the method for processing a DRX in the above method embodiments is implemented.

The memory 1002 may include a program storage area and a data storage area; the program storage area may store operation systems and application programs needed by at least one function; and the data storage area may store data created based on the use of a positioning terminal device, etc. In addition, the memory 1002 may include a high-speed random access memory, and may also include a non-transitory memory, such as at least one magnetic disk storage device, a flash memory device, or other non-transitory solid-state storage devices. Optionally, the memory 1002 includes a memory arranged remotely relative to the processor 1001 that may be connected to the positioning terminal device via a network. The example of the above networks includes but not limited to the Internet, an enterprise intranet, a local area network, a mobile communication network and their combination.

The terminal device configured to perform the method for processing a DRX may further include an input device 1003 and an output device 1004. The processor 1001, the memory 1002, the input device 1003, and the output device 1004 may be connected through a bus or in other ways. FIG. 10 takes connection via a bus as an example.

The input device 1003 may receive input digital or character information, and generate a key signal input related to user settings and function control of the positioning terminal device, such as a touch screen, a keypad, a mouse, a track pad, a touch pad, an indicating rod, one or more mouse buttons, a trackball, a joystick and other input devices. The output device 1004 may include a display device, an auxiliary lighting device (for example, a LED) and a tactile feedback device (for example, a vibration motor), etc. The display device may include but not limited to a liquid crystal display (LCD), a light emitting diode (LED) display and a plasma display. In some implementations, the display device may be a touch screen.

Various implementations of the systems and technologies described herein may be implemented in a digital electronic circuit system, an integrated circuit system, a dedicated application specific integrated circuit (ASIC), a computer hardware, a firmware, a software, and/or their combinations. The various implementations may include: being implemented in one or more computer programs, and the one or more computer programs may be executed and/or interpreted on a programmable system including at least one programmable processor, and the programmable processor may be a dedicated or a general-purpose programmable processor that may receive data and instructions from a storage system, at least one input device, and at least one output device, and transmit the data and instructions to the storage system, the at least one input device, and the at least one output device.

The computer programs (also called as programs, software, software applications, or codes) include machine instructions of a programmable processor, and may be implemented with high-level procedures and/or object-oriented programming languages, and/or assembly/machine languages. As used herein, the terms "a machine-readable medium" and "a computer-readable medium" refer to any computer program product, device, and/or apparatus configured to provide machine instructions and/or data for a programmable processor, for example, a magnetic disk, an optical disk, a memory, a programmable logic device (PLD), including a machine-readable medium that receive machine instructions as machine-readable signals. The term "a machine-readable signal" refers to any signal configured to provide machine instructions and/or data for the programmable processor.

In order to provide interactions with the user, the systems and technologies described here may be implemented on a computer which has: a display device for displaying information to the user (for example, a CRT (cathode ray tube) or a LCD monitor); and a keyboard and a pointing device (for example, a mouse or a trackball) through which the user may provide inputs to the computer. Other types of devices may further be configured to provide interactions with the user, for example, the feedbacks provided to the user may be any form of sensory feedbacks (for example, visual feedbacks, auditory feedbacks, or tactile feedbacks); and inputs from the user may be received in any form (including an acoustic input, a speech input, or a tactile input).

The systems and technologies described herein may be implemented in a computing system including back-end components (for example, as a data server), or a computing system including middleware components (for example, an application server), or a computing system including front-end components (for example, a user computer with a graphical user interface (GUI) or a web browser through which the user may interact with the implementations of the system and technology described herein), or a computing system including any combination of such back-end components, middleware components or front-end components. The system components may be connected to each other through any form or medium of digital data communication (for example, a communication network). Examples of communication networks include: a local area network (LAN), a wide area network (WAN), and an internet.

The computer system may include a client and a server. The client and server are generally far away from each other and generally interact with each other through a communication network. The relation between the client and the server is generated by computer programs that run on the corresponding computer and have a client-server relationship with each other.

It should be understood that, various forms of procedures shown above may be configured to reorder, add or delete steps. For example, the steps described in the present disclosure may be executed in parallel, sequentially, or in a different order, as long as the desired result of the technical solution disclosed in the present disclosure may be achieved, which will not be limited herein.

The above specific implementations do not constitute a limitation on the protection scope of the present disclosure. Those skilled in the art should understand that various modifications, combinations, sub-combinations and substitutions may be made according to design needs and other factors. Any modification, equivalent replacement, improvement, etc., made within the spirit and principle of the embodiments of the present disclosure shall be included within the protection scope of embodiments of the present disclosure.

What is claimed is:

1. A method for processing a discontinuous reception (DRX), performed by a terminal device, the method comprising:

determining that a transmission time of a downlink hybrid automatic repeat request (HARQ) process feedback of the terminal device is postponed, in a case that there is no extra uplink transmission power left for the terminal device to transmit the HARQ process feedback; and processing a downlink HARQ timer of the HARQ process feedback based on a resource for the transmission time postponed;

wherein processing the downlink HARQ timer of the HARQ process feedback based on the resource comprises:

starting a downlink HARQ round trip time (RTT) timer of the HARQ process feedback after a transmission end position of the resource;

wherein the resource for the transmission time postponed and a resource before the transmission time postponed are capable of performing the HARQ process feedback.

2. The method according to claim 1, wherein processing the downlink HARQ timer of the HARQ process feedback based on the resource comprises:

starting a downlink HARQ retransmission timer of the HARQ process feedback after the transmission end position of the resource.

3. The method according to claim 1, wherein a downlink data channel corresponding to the HARQ process feedback is a semi-persistent scheduling downlink data channel.

4. A terminal device, comprising:

a processor; and a memory storing a computer program executable by the processor, wherein the processor is configured to:

determine that a transmission time of a downlink hybrid automatic repeat request (HARQ) process feedback of the terminal device is postponed, in a case that there is no extra uplink transmission power left for the terminal device to transmit the HARQ process feedback; and start a downlink HARQ round trip time (RTT) timer of the HARQ process feedback after a transmission end position of a resource for the transmission time postponed;

wherein the resource for the transmission time postponed and a resource before the transmission time postponed are capable of performing the HARQ process feedback.

5. The terminal device according to claim 4, wherein the processor is further configured to:

start a downlink HARQ retransmission timer of the HARQ process feedback after the transmission end position of the resource.

6. The terminal device according to claim 4, wherein a downlink data channel corresponding to the HARQ process feedback is a semi-persistent scheduling downlink data channel.

7. A non-transitory computer-readable storage medium storing instructions that, when executed by a processor of a terminal device, cause the terminal device to perform a method for processing a discontinuous reception (DRX), the method comprising:

determining that a transmission time of a downlink hybrid automatic repeat request (HARQ) process feedback of the terminal device is postponed, in a case that there is no extra uplink transmission power left for the terminal device to transmit the HARQ process feedback; and processing a downlink HARQ timer of the HARQ process feedback based on a resource for the transmission time postponed;

wherein processing the downlink HARQ timer of the HARQ process feedback based on the resource comprises:

starting a downlink HARQ round trip time (RTT) timer of the HARQ process feedback after a transmission end position of the resource;

wherein the resource for the transmission time postponed and a resource before the transmission time postponed are capable of performing the HARQ process feedback.

8. The storage medium according to claim 7, wherein processing the downlink HARQ timer of the HARQ process feedback based on the resource comprises:

starting a downlink HARQ retransmission timer of the HARQ process feedback after the transmission end position of the resource.

9. The storage medium according to claim 7, wherein a downlink data channel corresponding to the HARQ process feedback is a semi-persistent scheduling downlink data channel.

* * * * *